United States Patent [19]

Yano et al.

[11] 4,330,004
[45] May 18, 1982

[54] ELECTROMAGNETIC VALVE

[75] Inventors: Kiyotosi Yano, Chiryu; Eizi Ishikawa, Nagoya; Shigeru Yoshiyama, Kariya, all of Japan

[73] Assignee: Nippondenso Co., Ltd., Kariya, Japan

[21] Appl. No.: 158,274

[22] Filed: Jun. 10, 1980

[30] Foreign Application Priority Data

Jul. 11, 1979 [JP] Japan .............................. 54/95233[U]

[51] Int. Cl.³ .......................... F16L 3/00; F16K 31/02
[52] U.S. Cl. .................................... 137/343; 137/315; 251/141
[58] Field of Search .................. 251/141, 143, 129; 137/343, 377, 382

[56] References Cited

U.S. PATENT DOCUMENTS

| | | | |
|---|---|---|---|
| 2,843,147 | 7/1958 | Penther | 251/141 X |
| 3,726,315 | 4/1973 | Sheppard | 251/141 X |
| 3,790,127 | 2/1974 | Reip | 251/129 |
| 4,067,541 | 1/1978 | Hunter | 251/141 X |
| 4,102,526 | 7/1978 | Hangraves | 251/141 |
| 4,132,194 | 1/1979 | Saito | 251/141 X |
| 4,150,686 | 4/1979 | El Sherif et al. | 137/377 |

*Primary Examiner*—A. Michael Chambers
*Attorney, Agent, or Firm*—Cushman, Darby & Cushman

[57] ABSTRACT

An electromagnetic valve comprises yoke means having a pair of projecting elements which protrude outwardly in the mounting side of said valve, one of said projecting elements having at its outward end a pawl which is outwardly bent, and the other projecting element having its outer end portion which is inwardly bent substantially at right angle, said outer end portion having a threaded aperture for bolting said yoke means to a mounting bracket, said pawl in said one projecting element being engaged by an opening which is formed in said mounting bracket.

4 Claims, 6 Drawing Figures

4,330,004

ELECTROMAGNETIC VALVE

BACKGROUND OF THE INVENTION

This invention relates to an electromagnetic valve, particularly such an electromagnetic valve that is suitable for mounting on a bracket together with other identical electromagnetic valves.

There is well known an electromagnetic valve having yoke means which is formed therein at the mounting side of the valve body and through which the electromagnetic valve is mounted on a bracket. When a plurality of such identical electromagnetic valves are mounted on a single bracket, a space for bolt-tightening operation must be left between each adjacent valves so that a relatively large bracket will be required. Furthermore, when a plurality of electromagnetic valves are mounted on the bracket together, a single connector for each electromagnetic valve may cause a worker to make an error in wiring. On the other hand, a single connector for all of the electromagnetic valves demands a printed circuit board and the like for connecting the electromagnetic valves with leads so that a complicated and time-consuming operation will be required.

SUMMARY OF THE INVENTION

It is an object of this invention to overcome the above problems in the prior art by providing an electromagnetic valve which can be positioned close to other identical electromagnetic valves on a single bracket and in which wiring operations can be accurately and easily effected.

An electromagnetic valve constructed according to this invention comprises yoke means having a pair of projecting elements which are provided at the mounting side of the valve body, one of said projecting elements having a pawl for insertion into an aperture of a mounting bracket while the other projecting element has an outward end which is inwardly bent substantially at a right angle and which has a threaded opening formed therein. Therefore, a bolt-tightening operation is effected only at the underside of the electromagnetic valve rather than the lateral side thereof so that a plurality of such electromagnetic valves may be mounted together on the bracket close to one another. Moreover, the electromagnetic valve of this invention comprises terminals which are provided to protrude outwardly from the valve body. These terminals can be soldered directly with the leads so that a single connector may be used to reduce errors in wiring and in the number of parts.

This invention will be now described in more detail in connection with the accompaying drawings.

BRIEF DESCRIPTION OF THE INVENTION

DESCRIPTION OF THE PREFERRED EMBODIMENTS

Figure 1:
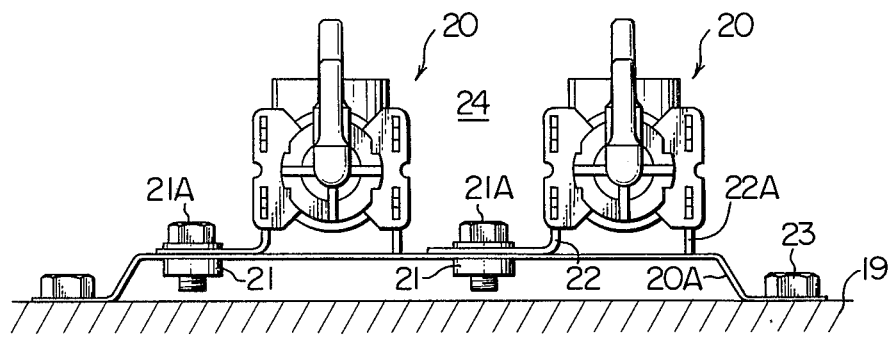
FIG. 1 is a view showing electromagnetic valves of the prior art which are mounted on a bracket.

Referring to FIG. 1, the prior art electromagnetic valve shown therein comprises a yoke provided at the mounting side thereof, the yoke including a pair of projecting elements 22, 22A. One of these projecting elements 22A has its end face engaging a bracket 20A which is mounted on a machine frame 19 by means of screws 23. The other projecting element 22 is outwardly bent substantially at a right angle. This bent portion has an opening (not shown) for receiving bolts 21A which are tightened to the bracket 20A by means of nuts 21. It is apparent in such a structure that a substantially large space 24 must be left between the adjacent electromagnetic valves 20 on the bracket 20a.

Figure 2:
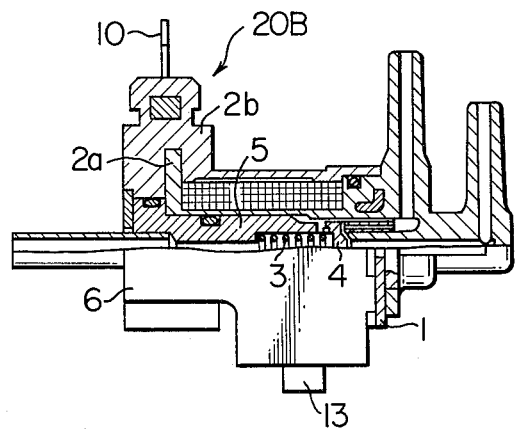
FIG. 2 is a side view showing, partly in section, an electromagnetic valve which is constructed according to this invention.
Figure 3:
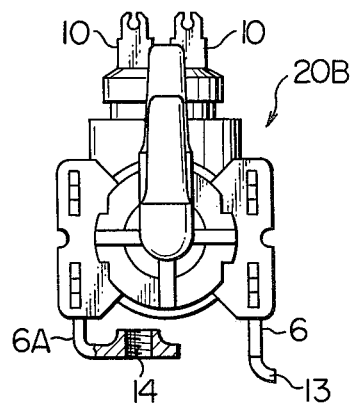
FIG. 3 is an end view of the electromagnetic valve shown in FIG. 2 as viewed from the right in FIG. 2.

Referring to FIGS. 2 and 3, an electromagnetic valve 20B comprises a bobbin 2a formed integrally with a plate 1, a housing 2b covering the bobbin 2a, a spring 3, a plunger 4 and a stator core 5, all arranged in a well known manner. Therefore, these parts will not be further described herein.

In accordance with this invention, the electromagnetic valve 20B comprises yoke means which is provided at the mounting side of the valve body. The yoke means includes a pair of projecting elements 6, 6A which protrude outwardly therefrom. Each of the projecting elements is of a unique configuration. Namely, one of the projecting element 6 has at its outward end a small pawl 13 which is bent outwardly therefrom while the other projecting element 6A has an outward end portion which is inwardly bent substantially at a right angle and which has a threaded aperture 14 formed therein.

Figure 4:
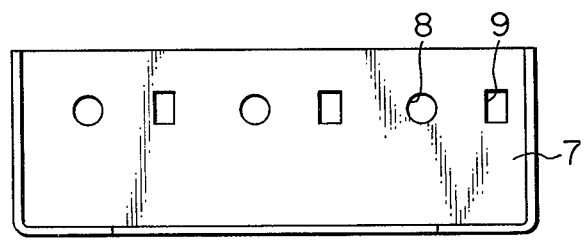
FIG. 4 is a view showing an example of a bracket for mounting the electromagnetic valve of this invention.
Figure 5:
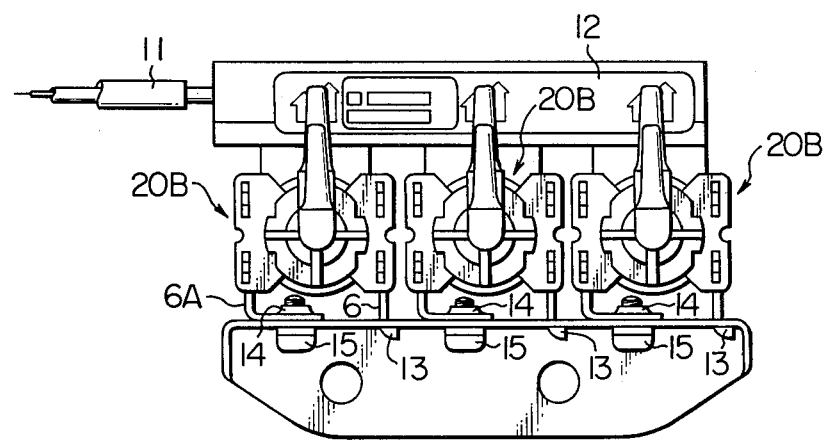
FIG. 5 is a plan view showing the electromagnetic valves of this invention which are mounted on the bracket shown in FIG. 4.

FIG. 4 shows a bracket 7 on which the electromagnetic valve 20B of this invention can be mounted. The bracket 7 includes circular openings 8 and rectangular openings 9 formed therein such that one circular opening 8 and one rectangular opening 9 are disposed as a pair. The bracket 7 shown in FIG. 4 has three pairs of openings 8 and 9 for mounting three electromagnetic valves 20B on the bracket together. Each of circular openings 8 is adapted to be aligned with the threaded aperture 14 of the projecting element 6A when the electromagnetic valve 20B is mounted on the bracket 7. Each of the rectangular openings 9 is adapted to be engaged by the pawl 13 of the projecting element 6 when the electromagnetic valve 20B is similarly mounted on the bracket 7. It is therefore apparent that each pair of openings 8, 9 are spaced from each other a distance which corresponds to the spacing between the threaded aperture 14 of the projecting element 6A and the pawl 13 of the projecting element 6. Thus, as shown in FIG. 5, each electromagnetic valve 20B can be firmly mounted on the bracket 7 by engaging the pawl 13 of the projecting element 6 within the rectangular opening 9 of the bracket 7 and aligning the threaded aperture 14 of the projecting element 6A with the circular opening 8 of the bracket and tightening the projecting element 6A to the bracket 7 by means of a screw 15. By comparing FIG. 5 with FIG. 1, it can be appreciated that the electromagnetic valves 20B can be disposed closer to one another than the prior art electromagnetic valves 20.

In accordance with this invention, the electromagnetic valve 20B further comprises a pair of terminals 10 which protrude outwardly from the bobbin 2a thereof as shown in FIGS. 2 and 3. These terminals 10 are connected with a coil (not shown) within the housing 2b and are soldered to leads 11.

Figure 6:
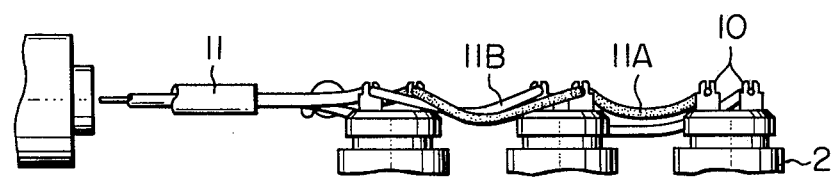
FIG. 6 is a view showing an end arrangement in the electromagnetic valves of this invention.

FIG. 6 illustrates an end arrangement for wiring three electromagnetic valves in which a lead 11A for connecting the valves to the plus side of a power source (not shown) is stripped at three positions that correspond to the plus terminals of the electromagnetic valves 20B. These stripped portions of the lead 11A are soldered with the respective plus terminals 10 of the electromagnetic valves. A lead 11B is used to connect the minus terminals 10 of the electromagnetic valves 20B with the minus side of the power source. If the three electromagnetic valves are actuated simultaneously under a single signal, the lead 11B is used to connect the minus terminals of the electromagnetic valves with one another simultaneously. On the other hand, if the electromagnetic valves are desired to be actuated separately, three identical leads 11B are used to separately connect the respective minus terminals with the minus side of the power source. Thus, a single connector can be used to wire the electromagnetic valves. Moreover, as shown in FIG. 5, the above end arrangement can be covered by a casing 12 which is fitted over the housings 2b of the electromagnetic valves and may be made of any suitable rubber or other material. The casing 12 may be filled with any suitable synthetic resin, such as epoxy resins, for providing water-proof and impact-proof properties.

While the preferred embodiment of this invention has been described with reference to the accompanying drawings, it is to be understood that many modifications and changes can be effected by those skilled in the art without departing from the spirit and scope of the invention which will be defined in appended claims.

What is claimed is:

1. An electromagnetic valve adapted to be secured to a mounting bracket, said valve comprising yoke means which includes a pair of projecting elements formed in the body of said valve to protrude outwardly from the mounting side thereof, one of said projecting elements having at its outward end a pawl provided with a preformed bend, and the other projecting element having at its outward end a preformed substantially right angle bend extending towards said one projecting element and having a threaded aperture formed therein, said bend of said one of said projecting elements being adapted to engage the bracket when said bends are brought in contact therewith, said valve further comprising a pair of terminals which are provided in the body of said valve to protrude outwardly therefrom at positions other than said mounting side.

2. A combination of a plurality of electromagnetic valves and a mounting bracket, each of said electromagnet valves comprising yoke means which includes a pair of projecting elements formed in the body of said valve to protrude outwardly from the mounting side thereof, one of said projecting elements having at its outward end a pawl provided with a preformed bend, and and the other projecting element having at its outward end a preformed substantially right angle bend extending towards said one projecting element and having a threaded aperture formed therein, both of said bends engaging the bracket, the valve further comprising a pair of terminals which are provided in the body of said valve to protrude outwardly therefrom at positions other than said mounting side, said mounting bracket including plural pairs of openings formed therein, said openings in each pair being spaced away from one another by a distance that corresponds to the spacing between the outward ends of said projecting elements in said yoke means, one of said openings in each pair being adapted to receive a screw for tightening the other projecting element to said mounting bracket by screwing said screw into said threaded aperture while the other opening is adapted to be engaged by said pawl of said one projecting element, the plural pairs of said openings being disposed in a relatively close relationship with one another.

3. The combination as defined in claim 2 wherein said terminals of the electromagnetic valves mounted on said bracket are connected with one another by means of leads to form an end arrangement, said end arrangement being covered with a protective casing.

4. The combination as defined in claim 3 wherein said protective casing is made of a material selected from a group which includes rubber and synthetic resins.

* * * * *